Feb. 17, 1959   E. H. LAND   2,873,658
PHOTOGRAPHIC APPARATUS
Filed July 5, 1956   5 Sheets-Sheet 1

INVENTOR.
Edwin H. Land
BY Brown and Mikulka
and
Robert E. Corb
ATTORNEYS

Feb. 17, 1959   E. H. LAND   2,873,658
PHOTOGRAPHIC APPARATUS
Filed July 5, 1956   5 Sheets-Sheet 2

INVENTOR.
Edwin H. Land
BY Brown and Mikulka
and
Robert E. Corb
ATTORNEYS

Feb. 17, 1959  E. H. LAND  2,873,658
PHOTOGRAPHIC APPARATUS
Filed July 5, 1956  5 Sheets-Sheet 3

INVENTOR.
Edwin H. Land
BY Broward Mikulka
and
Robert E. Corb
ATTORNEYS

Feb. 17, 1959  E. H. LAND  2,873,658
PHOTOGRAPHIC APPARATUS
Filed July 5, 1956  5 Sheets-Sheet 5

INVENTOR.
Edwin H. Land
BY
Brown and Mikulka
and
Robert E. Corb
ATTORNEYS

2,873,658
Patented Feb. 17, 1959

United States Patent Office

2,873,658
PHOTOGRAPHIC APPARATUS

Edwin H. Land, Cambridge, Mass., assignor to Polaroid Corporation, Cambridge, Mass., a corporation of Delaware Application July 5, 1956, Serial No. 595,989

14 Claims. (Cl. 95—13)

This invention relates to photography and more particularly to novel photographic apparatus, such as a camera, wherein a photosensitive element is exposed and processed.

The present invention is concerned with the provision of apparatus, preferably in the form of a camera, for use with photographic assemblages each including a photosensitive element, a second substantially rigid element, one of said elements of said assemblage being substantially rigid, and means containing a fluid processing composition. The camera includes means for storing a plurality of the assemblages, positioning successive individual assemblages for exposure and processing each exposed assemblage by distributing a fluid composition carried thereby within the assemblage on the photosensitive element. While the second rigid element, for example, may merely aid in the spreading of the fluid composition in a uniform layer on the photosensitive element, in a preferred form it serves as an image-receptive element or support for a positive print formed by diffusion transfer reversal.

A variety of forms of photographic apparatus of this type have been proposed wherein each of a succession of individual photographic assemblages is moved, following exposure, between a pair of pressure-applying members for releasing the fluid composition carried by the assemblage and distributing the composition within the assemblage. Heretofore, movement of successive photographic assemblages between the pressure-applying members has been effected by pulling or drawing each assemblage with the aid of a leader or similar element attached thereto and/or by manipulating the pressure-applying members (rolls) so that they function to move the assemblage. Both of these expedients, while being essentially satisfactory, necessitate a camera structure complicated by the inclusion of the requisite means for storing and manipulating a plurality of leaders or means for rotating the pressure-applying rolls and means (such as for manipulating leaders) for initially locating each assemblage between the rolls. The construction of the present invention eliminates the necessity for storing and handling a plurality of leaders or for rotating a pair of pressure-applying rolls and is particularly adapted, although not limited, to embodiment in a camera of the so-called miniature type capable, for example, of taking pictures of 35 mm. size or smaller.

It is one object of the invention to provide photographic apparatus, preferably in the form of a camera, for positioning a succession of individual photographic assemblages for exposure, exposing and processing each assemblage, said apparatus comprising means for pushing each individual exposed assemblage from the position in which it was exposed through a passage wherein a fluid composition carried by said assemblage is released and distributed therein.

Another object of the invention is to provide, in apparatus of the type described, means coupled with the means for pushing individual photographic assemblages from exposure position, for actuating an exposure means so as to expose each photographic assemblage prior to movement from exposure position.

A further object of the invention is to provide a construction as described which is particularly suited for embodiment in a small camera characterized by its compactness, inexpensiveness and simplicity of design and operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally the present invention contemplates the provision of a novel, inexpensive camera capable of housing, exposing and processing a sequence of photographic assemblages to produce finished photographic prints, preferably positive transparencies. The camera is preferably of the miniature type, being only sufficiently large to produce a transparency, for example of 35 mm. size, and is simple in its operation, requiring only that the operator depress a plunger for exposing and processing a photographic assemblage. The photographic assemblages are generally rectangular in form and substantially rigid in construction, each comprising a photosensitive element, a print-receiving element and a container of a fluid processing composition. In the preferred form of the camera, the assemblages are arranged in stacked relation in a chamber at the rear of the camera so that the foremost assemblage is automatically located in exposure position. A passage is provided at one side of the chamber and is so proportioned and positioned as to admit only the foremost assemblage, and a manually operable reciprocating plunger is provided at the opposite side of the chamber for pushing the foremost assemblage from the chamber through the passage wherein the fluid composition is released from the container and spread in a layer between the photosensitive element and the print-receiving element. The camera includes exposure means in the form of a conventional shutter mechanism and means coupling the shutter and plunger so that the shutter is actuated to make an exposure during and in response to the initial movement of the plunger prior to movement of the foremost assemblage from exposure position. The assemblage, as it is moved through the passage, advances between a pair of pressure-applying members into another chamber wherein it is allowed to remain in a lighttight environment during a predetermined processing period. At the end of this period the assemblage may be withdrawn from the chamber and the photosensitive element may then be stripped along with the container from the print-receiving element which serves as a support for a positive print formed preferably by silver transfer reversal.

The apparatus of the invention is ideally suited for incorporation into the structure of a camera, for example of the type disclosed in copending application Serial No. 492,848, filed March 8, 1955, wherein a camera and viewing device are combined and the imbibition or processing chamber of the camera comprises the viewer. The advantages of the present invention become readily apparent when it is considered in conjunction with the structure of the camera of the above-identified application which also functions to expose and process a succession of photographic assemblages but includes means for storing and manipulating a multiplicity of leaders attached to the assemblages.

Figure 1:
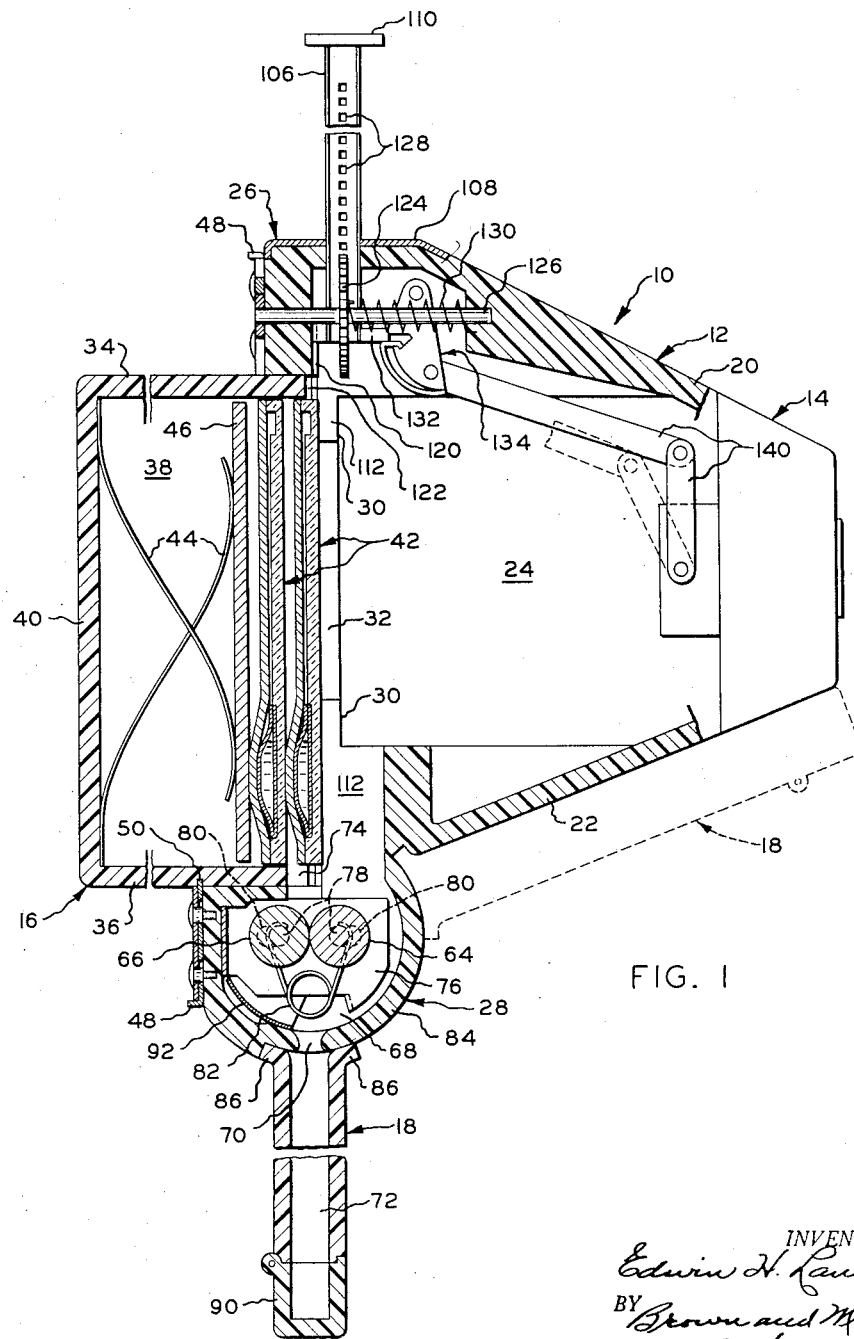
Figure 1 is an elevational view, partially in section, of a camera embodying the herein-disclosed invention with a plurality of photographic assemblages mounted therein, the section being taken substantially along a plane midway between the sides of the camera and showing the camera in condition to make an exposure.
Figure 2:
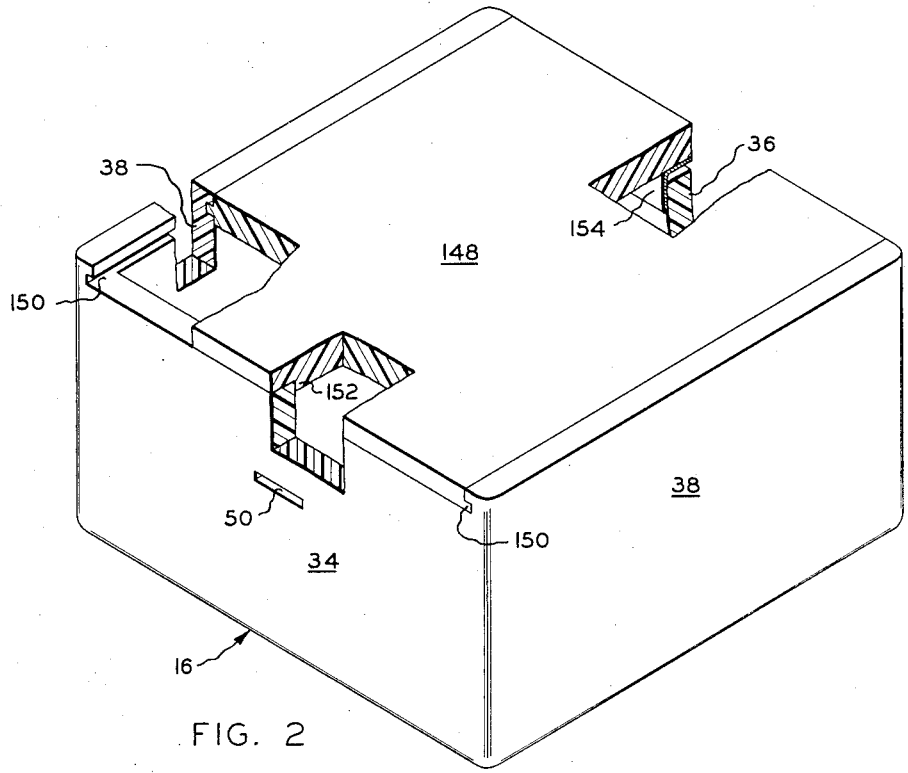
Fig. 2 is a perspective view, partially in section, of a portion of the housing of the camera of Fig. 1 comprising a film-holding magazine therefor.

Reference is now made to Fig. 1 of the drawings wherein there is illustrated apparatus in the form of a camera 10 embodying the invention. Camera 10 is preferably of the miniature type, capable, for example, of taking a picture of conventional 35 mm. size, and is illustrated in the drawings as somewhat enlarged so as to more clearly show its construction and operation. The camera comprises a housing including a forward section 12 on which is mounted a conventional lens and shutter assemblage 14, a rear section 16 comprising a film magazine removably secured to forward section 12 and a third section 18 which serves as a processing chamber and may also be removably secured to forward section 12.

Forward housing section 12 may be of any convenient form and is shown as preferably tapered toward the front and includes upper wall 20, lower wall 22 and side walls 24 on which is mounted lens and shutter assemblage 14 and which provides a path for light transmitted by the lens of assemblage 14. At the rear of forward section 12, there is provided an upper enlarged portion 26, a lower enlarged portion 28 and a rear wall 30. The rear surface of rear wall 30 is predeterminedly positioned with respect to the focal surface of the lens of assemblage 14 so that the photosensitive element of a film assemblage, positioned for exposure against the rear surface of rear wall 30, is located substantially in the focal surface of the lens. Accordingly, for use with a photographic assemblage of the type described hereinafter, the rear surface of wall 30 is located substantially parallel with and just slightly forward of the focal surface of the lens. Rear wall 30 is provided with an aperture 32 for transmitting light from the lens to a photographic assemblage positioned for exposure. It is to be noted that the construction of all sections of the housing may be such that they may be fabricated easily and inexpensively of molded plastic materials.

Rear housing section 16 is in the form of a generally rectangular box and comprises upper and lower walls designated 34 and 36, respectively, side walls 38 and a rear wall 40. Section 16 is adapted to contain a plurality of photographic assemblages 42 arranged in stacked relation and includes means in the form of springs 44 and pressure plate 46 for holding the foremost assemblage 42 of the stack in position for exposure against the rear surface of wall 30. Camera 10 is shown in Fig. 1 in condition to expose and process an assemblage 42 with rear housing section 16 secured to the rear of forward section 12. For the purpose of securing section 16 to section 12, there is provided on the rear of section 16 a pair of manually slidable locking members 48 adapted to project into notches or grooves 50 in upper and lower walls 34 and 36 of section 16 when the latter is in operative position, as shown.

Figure 6:
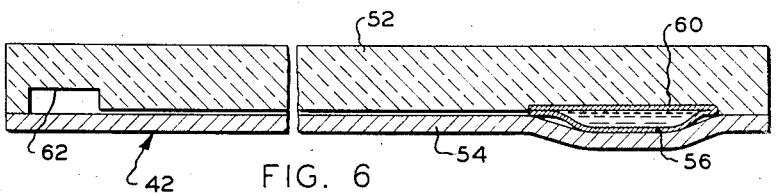
Fig. 6 is an enlarged sectional view of a photographic assemblage adapted to use in the camera of Fig. 1.
Figure 7:
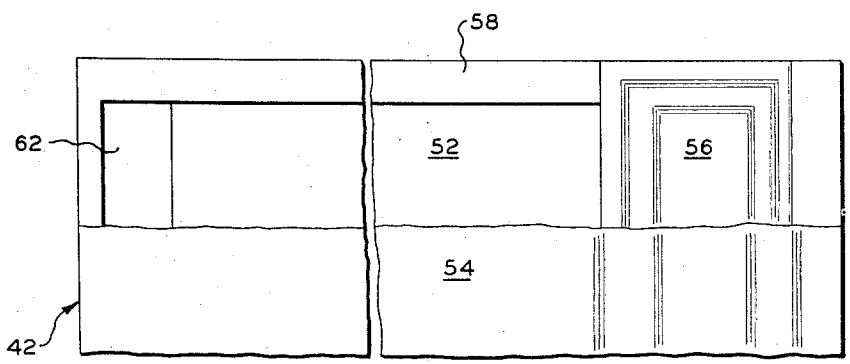
Fig. 7 is a plan view, partially broken away, of the photographic assemblage of Fig. 6.

A preferred form of photographic assemblage 42, adapted to be employed in the invention, is shown in detail in Figs. 6 and 7 with the thickness of the materials comprising the assemblage being exaggerated for purposes of illustration. Assemblage 42, in the form shown, comprises a generally rectangular print-receiving element 52, a photosensitive element 54 secured in superposition with element 52 and substantially coextensive therewith and a rupturable container 56 carrying a fluid processing composition and secured between elements 52 and 54 adjacent one end of the assemblage. As previously intimated, the assemblage is preferably adapted to the production of a positive print by silver transfer reversal and, accordingly, the inner surface of the photosensitive element, i. e., the surface disposed adjacent element 52, comprises a gelatino silver halide emulsion carried on a support layer of any suitable sheet material such as paper. Photosensitive element 54 is adapted to be exposed through the print-receiving element so that the latter must be transparent, at least on the area opposite the area of the photosensitive element intended to be exposed. The print-receiving element is intended to be substantially rigid and inflexible and for this reason is shown as being considerably thicker than the photosensitive element. Element 52 may be formed of a variety of materials including glass and organic plastic materials, the latter being particularly suited for this purpose. Since a plurality of assemblages are intended to be provided in stacked relation within rear housing section 16 and the foremost assemblage exposed, the photosensitive element 54 of each assemblage should be opaque to actinic light to prevent exposure of all the assemblages.

In a preferred form, print-receiving element 52 is adapted to serve as a support for a layer of fluid composition originally carried in container 56 and is adapted to be spread in the form of a film on element 52 in which a visible silver transfer image is produced. For this purpose the inner surface of element 52 may comprise a layer containing agents for stabilizing the transfer image. The fluid contents of container 56 preferably include an aqueous alkaline solution of a silver halide developer, a silver halide solvent and a film-forming agent. This fluid composition, when spread in a thin layer between an exposed gelatino silver halide emulsion layer on element 54 and the inner surface of print-receiving element 52, reduces the exposed silver halide to silver and reacts with unexposed silver halide to form a soluble silver complex which, in turn, is reduced to silver in a silver-receptive environment. This silver-receptive environment includes minute silver precipitating particles provided in the fluid layer. For examples of processes of this type together with photographic materials useful therein, reference may be had to Letters Patent No. 2,662,822, issued December 15, 1953.

The photographic assemblage described may be readily modified without changing its general form so that it lends itself to a variety of photographic processes whereby visible images may be produced. For example, the print-receiving element or its surface may be provided with different types of light-modifying screens, including screens comprising a multiplicity of minute lens elements or lenticules. Examples of materials of this type are described in detail in Patent No. 2,726,154, issued to Edwin H. Land on December 6, 1955. With this type of film unit, prints may be produced by proper control of exposure which may be exhibited in color or which possess stereoscopic effects. Further, the composition of the materials comprising the assemblage may be such that the print or visible image is produced in terms of dyes instead of silver.

The fluid contents of container 56 are adapted to be spread between elements 52 and 54 in response to movement of the assemblage beginning at the end adjacent the container between a pair of pressure-applying members. As a means for controlling the thickness of the layer of fluid, print-receiving element 52 is provided with raised marginal sections 58 bordering the area over which the fluid is to be spread. The assemblage illustrated is adapted to be advanced between a pair of pressure-applying members of the so-called "fixed gap" type wherein the maximum spacing of the members is fixed and is substantially equal to the combined thickness of the print-receiving element 52, photosensitive element 54 and the layer of fluid composition spread therebetween. Assemblage 42 is adapted for this purpose by the provision of a recess 60 in print-receiving element 52 adapted to seat container 56, the latter being secured to photosensitive element 54. The depth of the recess is such that, as the assemblage is moved between the fixed gap spreaders, container 56 is completely collapsed but does not add to the overall thickness of the assemblage.

To insure complete spreading of the fluid in a layer of uniform thickness over the entire area desired, the quantity of fluid supplied is usually more than is required and, accordingly, means are provided for trapping the excess fluid. In the form shown, this means comprises a recess 62 in element 52 located adjacent the edge thereof opposite container 56.

The two elements of the assemblage are adapted to be maintained in superposition for a predetermined processing period following spreading of the processing fluid in a layer therebetween and, at the end of this period, are separated from one another. When the two elements are separated, the layer of fluid composition containing the positive silver image is retained on print-receiving element 52 while container 56 remains adhered to photosensitive element 54. The layer of fluid on element 52 may be subjected to a further treatment for the purpose of hardening, protecting and preserving the layer and the positive image.

Camera 10 includes a pair of pressure-applying members in the form of rolls 64 and 66 mounted within a chamber or passage, designated 68, provided by lower enlarged portion 28 of the camera housing. Each assemblage 42, following exposure in position against the rear surface of wall 30, is moved downward generally in a plane through chamber 68 between rolls 64 and 66 and from chamber 68 through a slot 70 provided therein. Third housing section 18 is disposed adjacent slot 70 in closing relation thereto and provides an imbibition chamber 72 adapted to receive the assemblage as it is moved through slot 70 and provides a lighttight environment for storing the assemblage during the processing period.

In order to allow for the sliding movement of an exposed assemblage downward from within rear housing section 16, lower wall 36 of this section is shorter than side walls 38 so as to provide a passage 74 between lower wall 36 and rear wall 30 having dimensions just sufficient to permit the passage of a single assemblage 42. In an alternative form of the apparatus rear wall 30 and lower wall 36 may be so constructed as to function themselves as a pair of fixed gap pressure-applying members, thereby eliminating the necessity for rolls 64 and 66 and the chamber or passage 68 in which they are housed.

Rolls 64 and 66 may comprise a spreading device of either the fixed gap type or the type wherein the pressure-applying members are resiliently urged toward one another so as to apply compressive pressure to an assemblage moved therebetween. In the form shown in Fig. 1, rolls 64 and 66 are pivotally mounted at their ends between a pair of support plates 76 comprising a bracket mounted within chamber 68. Rolls 64 and 66 include stub shafts 78 at their ends journaled in slots 80 in plates 76, permitting limited movement of the rolls with respect to one another into contact with one another and to a predetermined fixed distance apart. To aid in preventing the admission of light into the camera through passage 74, rolls 64 and 66 are preferably urged into contact with one another by a pair of relatively weak springs 82 located in engagement with stub shafts 78. Springs 82 are preferably only of sufficient strength to hold the rolls together and have no effect on the spreading action of the rolls which, in the form shown, are of the fixed gap type. Alternatively, springs 82 may be provided which are of sufficient strength to apply the compressive pressure necessary to effect the spreading of the processing fluid.

Portion 28 includes a cylindrical wall 84 in which is formed slot 70 and third housing section 18 is mounted for pivotal movement about the axis of cylindrical wall 84 so that it may be pivoted from the operative position shown in Fig. 1, wherein it is positioned to receive assemblages moved through slot 70, to an inoperative position (shown in broken lines) at one side of slot 70 disposed against lower wall 22, wherein it is out of the way. Section 18 includes front and rear walls, each having lips 86 or other suitable means for bearing against cylindrical wall 84 and making a substantially lighttight juncture therewith. Chamber 72 may be dimensioned as shown in Fig. 1 so as to contain a single photosensitive assemblage or so as to contain a plurality of assemblages in stacked relation. In this latter instance, illustrated in Fig. 11, a pair of springs 88 may be provided in the chamber for engaging the margins of each successive assemblage to aid in stacking successive assemblages. Chamber 72 is open at the end opposite slot 70 and is provided with a removable pivotal light-tight closure 90 through which assemblages may be withdrawn from chamber 72. It will be noted that section 18 may be pivoted to inoperative position with an assemblage located within chamber 72 without causing exposure of the assemblage since the lighttight seal between lips 86 and wall 84 is maintained at all times.

Figures 3, 4:
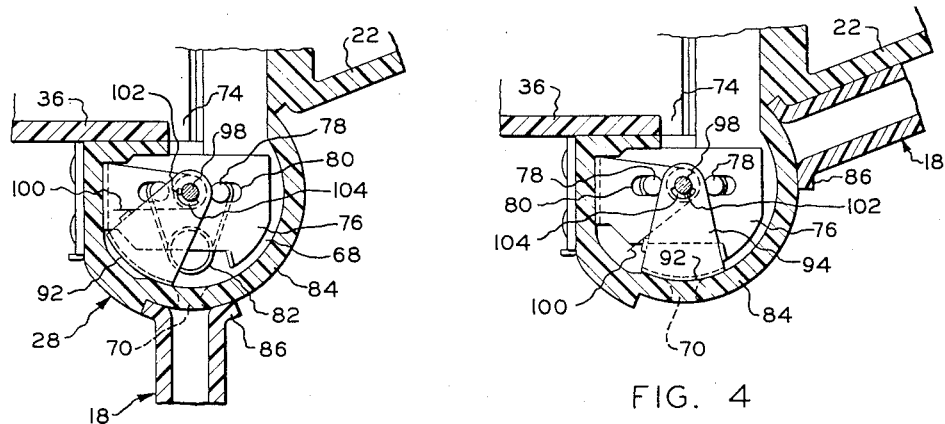
Figs. 3 and 4 are sectional views of a portion of the camera of Fig. 1 taken along a plane immediately underlying a side wall of the camera housing and showing two operative positions of a part of the camera mechanism.

Means are provided for closing slot 70 against the admission of light when section 18 is pivoted from its operative position in closing relation to the slot. In the form shown, this means comprises an elongated closure member 92 having an arcuate cross section and mounted between a pair of arms 94. The arms are pivotally mounted on shafts 98, in turn pivotally mounted on plates 76 at the axis of cylindrical wall 84, so that closure member 92 is disposed closely adjacent the inner surface of wall 84 and is pivotable from a closed position, shown in Fig. 4, wherein it extends across slot 70 to an open position, shown in Figs. 1 and 3, at one side of slot 70. Torsion springs 100 are provided for urging closure member 92 into closed position across slot 70.

The operation of closure member 92 is made responsive to the movement of section 18 so that member 92 is automatically moved from a closed position as section 18 is moved into operative position and is allowed to return to a closed position when section 18 is moved to inoperative position. To this end, shafts 98 project exteriorly of portion 28 and section 18 is mounted on shafts 98 so that the shafts pivot with the section. Each of shafts 98 is provided with a key 102 located in a keyway 104 in one of arms 94 so that as section 18 is pivoted (in a clockwise direction viewing Figs. 3 and 4) into operative position in closing relation to slot 70, member 92 is pivoted in the same direction from across slot 70.

Figure 5:
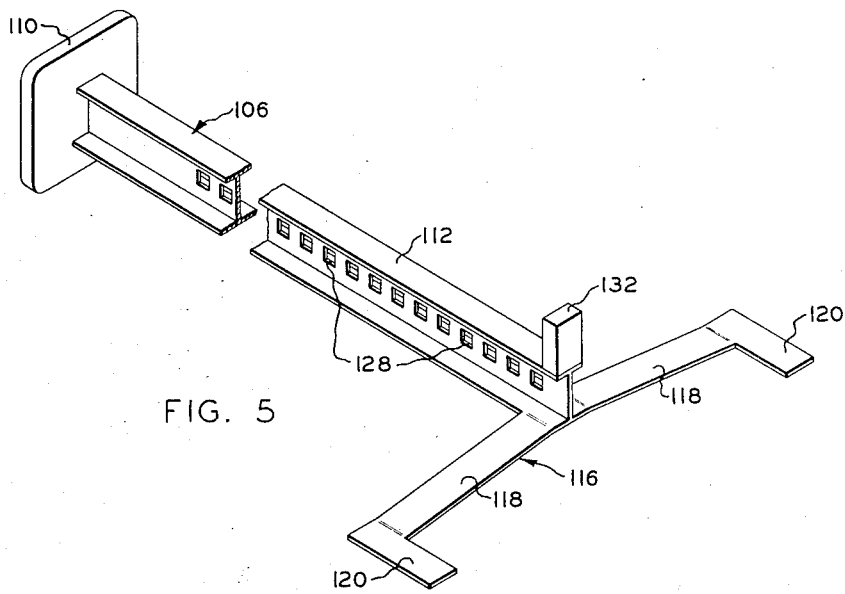
Fig. 5 is a perspective view, partially broken away, of a component of the mechanism of the camera of Fig. 1.

The camera includes manually operable reciprocating means for moving each successive assemblage 42 from exposure position downward between rolls 64 and 66 for processing each assemblage. In the form shown in Figs. 1 and 5, this means comprises a slidable bar 106 extending downward across rear wall 30 from top to bottom of the camera and through an opening in a cover plate 108 on upper enlarged portion 26. Bar 106 is at least of sufficient length to extend from adjacent roll 64 upward across rear wall 30 and through cover plate 108 exterior of the camera housing, and may be of any convenient cross-sectional shape, for example in the form of an I (as shown), a T or channel, etc. The opening in plate 108 through which bar 106 extends is preferably of the same cross-sectional shape so as to form a close and substantially lighttight sliding fit. A manually engageable push button 110 is provided on the end of bar 106 extending exteriorly of plate 108.

Bar 106 is slidable or reciprocable in a plane substantially parallel with the rear surface of wall 30 and within a channel or groove 112 in the rear wall so that the rearwardmost surface portion of bar 106 is located forward of the rear surface of wall 30 and the forwardmost surface portion 114 of bar 106 is forward of wall 30. Bar 106 may be moved so that its end may be moved upward and downward within the camera from a position adjacent doll 64 to a position within upper enlarged portion 26 above upper wall 34 of rear housing section 16. A springlike engagement member 116 is provided comprising a resilient arm 118 secured at its midpoint to the end of bar 106 and extends substantially at right angles to the bar and has at its ends a pair of downwardly projecting feet 120. Engagement member 116 is preferably formed of a single blank of flat resilient sheet material which is thinner than photographic assemblages 42. Arm 118 extends from side to side of aperture 32 so that feet 120 are located behind and in contact with the rear surface of wall 30 in position to engage an assemblage. So that feet 120 may be moved to a position above upper wall 34 of rear housing section 16, upper wall 34 is slightly shorter than the side walls 38 of section 16 so as to provide a passage 122 between upper wall 34 and rear wall 30 through which feet 120 are movable, but of insufficient width to admit the passage of an assemblage 42. Arms 118, being resilient, are deformed slightly (to the rear) so that feet 120 are always urged into contact with the rear surface of wall 30 between the wall and the margins of a photographic assemblage 42. Since the rearwardmost portion of bar 106 and arm 118 is located forward of the rear surface of wall 30, neither the bar nor the arm contacts a film assemblage 42. Only feet 120 contact the film assemblage and they do so along the margins of the assemblage, thereby eliminating the likelihood of the central light-transmitting portion of the assemblage being scratched or otherwise marred.

Engagement member 116 is movable from an initial position, shown in Fig. 1, within upper portion 26 wherein feet 120 are out of engagement with an assemblage 42, downward into engagement with an assemblage. It is to be noted that feet 120 are movable at least a predetermined distance before making engagement with an assemblage and before the assemblage so engaged is moved through passage 74 between the rolls 64 and 66. Feet 120 extend downward toward rolls 64 and 66 beyond the end of bar 106 so that they will project at least into the bite of the rolls to insure that each assemblage is pushed completely between the rolls when bar 106 is fully depressed.

Means are provided for returning bar 106 from its fully depressed position to its initial position, wherefrom it may again be depressed for pushing an exposed assemblage 42 between the rolls 64 and 66. This last-mentioned means comprises a gear 124 secured to a shaft 126 pivotally mounted within upper portion 26. Bar 106 is provided with a series of apertures 128 in one side extending in a line substantially the full length of the bar and forming, in effect, a rack adapted to be engaged with gear 124 so that gear 124 and shaft 126 are pivoted in response to sliding movement of bar 106. Shaft 126 is journaled at its ends in the front and rear walls of upper portion 26 with its axis generally perpendicular to bar 106 and the rear surface of wall 30. Coiled around shaft 126 is a torsion spring 130 secured at one end to gear 124 and anchored at its other end to the camera housing so that the spring is wound or tensioned by the downward movement of bar 106 and is effective to cause the return or upward movement of the bar to its initial position. A suitable manually operable locking device may be provided for securing shaft 126 against rotation and thereby releasably retaining bar 106 in its completely depressed position with button 110 against plate 108 so that the bar will not protrude outside of the camera housing when the camera is not in use.

The camera includes means responsive to movement of bar 106 into its initial position for cocking or setting the shutter, and responsive to the initial downward movement of the bar for releasing or tripping the shutter and exposing an assemblage 42 prior to movement of the assemblage downward in response to engagement with feet 120. By virtue of this arrangement, exposure is prevented when the bar is in its depressed position extending across aperture 32, and exposure is effected together with processing of an assemblage by the simple depression of a single manually operable element. The shutter setting or cocking and tripping or releasing means is shown in detail in Figs. 1 and 8 through 10, and includes a forwardly extending cam engagement member 132 on the end of bar 106 and a cam 134 mounted within housing portion 26 and adapted to be pivoted in response to movement of bar 106. Cam 134 is mounted for pivotal movement within portion 26 on a shaft 136 located forward of bar 106 with its axis perpendicular to bar 106 and in a plane substantially parallel with the rear surface of wall 30. Cam 134 includes an engagement portion, designated 138, and extends downward from shaft 136 and is connected through a linkage 140 to the mechanism of the shutter, the latter including spring means for biasing portion 138 of the cam in a clockwise direction (viewing Figs. 1 and 8 through 10) toward bar 106.

Figure 8:
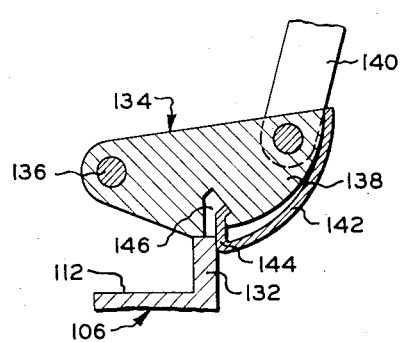
Figs. 8, 9 and 10 are sectional views of another portion of the mechanism of the camera of Fig. 1 illustrating three operative positions of the mechanism.
Figure 9:
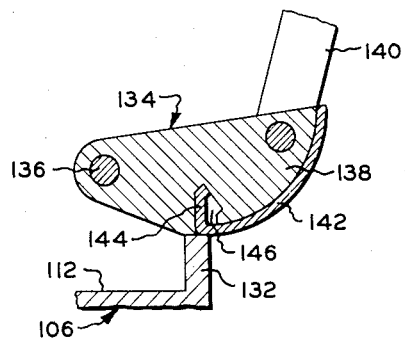
Figure 10:
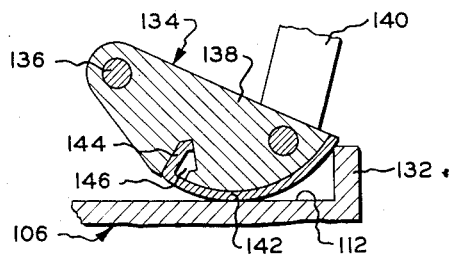

Engagement portion 138 of cam 134 includes a surface so formed as to coact with engagement member 132 during the return or upward movement of bar 106 to pivot the cam in a counterclockwise direction and thereby cock the shutter. The cam includes means responsive to the downward movement of bar 106 and member 132 for imparting an additional counterclockwise movement to the cam and thereby trip the shutter. This last-mentioned means comprises a curved spring 142 secured at one end to the cam and providing the surface thereof which actually contacts member 132. The free end of spring 142, designated 144, is biased away from the cam toward bar 106 so that during upward movement of member 132 (see Fig. 9) the latter holds the spring against the cam and, as member 132 moves past the free end of spring 142, free end 144 moves outward and rearward toward bar 106 as seen in Fig. 8. Free end 144 is bent at a right angle toward the cam so as to form a detent adapted to be engaged by member 132 as the bar is depressed whereby the requisite counterclockwise rotation is imparted to the cam. A recess 146 is provided in the surface of the cam for seating free end 144 and is so formed as to predeterminedly limit the movement of the free end away from the cam.

As previously noted, rear section 16 is adapted to act as a magazine for containing a plurality of assemblages 42 and preferably serves as the container in which the assemblages are supplied. Accordingly, a lighttight closure is provided for section 16 for holding the assemblages therewithin and, in the form shown, comprises a dark slide 148 secured across the front of section 16 in parallel grooves 150 in side walls 38. The thickness of dark slide 148 is equal to or less than the thickness of assemblages 42 so that the dark slide may be pushed in the same manner as an assemblage 42 from its position in contact with rear wall 30, through passage 74, between rolls 64 and 66. Dark slide 148 includes a shoulder 152 at its uppermost edge for engaging and forming a lighttight seal with the forward edge of upper wall 34. Since passage 74 must necessarily be wider than the thickness of slide 148 in order to permit the passage of an assemblage in the region of a container 56 through the passage without rupturing the container, dark slide 148 does not engage the forward edge of lower wall 36 to make a lighttight seal. For this purpose a flap 154 is provided on the inner edge of the end portion of slide 148 and extends into section 16 where it may be secured to the inner surface of lower wall 36. Flap 154 may be formed of paper or other suitable light-opaque sheet material and is adapted to pass between rolls 64 and 66 when slide 148 is pushed between the rolls.

In the operation of the camera, a magazine comprising rear section 16 is attached to the rear of the camera with dark slide 148 against the rear surface of rear wall 30. Bar 106 is then depressed so that feet 120 engage the upper end of slide 148 and push the slide between rolls 64 and 66. Thereafter to take a picture the operator allows the plunger to return to its initial position, engagement member 132 coacting with cam 134 to cock the shutter. With the bar in its initial position, the foremost assemblage 42 is retained in exposure position against the rear surface of wall 30 and to make an exposure the operator depresses bar 106, causing member 132 to engage free end 144 of spring 142, pivoting the cam and tripping the shutter during the initial movement of the bar prior to engagement and movement of the assemblage by feet 120. Continued downward movement of bar 106 causes the exposed assemblage to be pushed through passage 74 and between rolls 64 and 66, which cause the fluid composition carried in container 56 to be ejected therefrom and spread in a thin layer between print-receiving element 52 and photosensitive element 54. The assemblage, as it is advanced between rolls 64 and 66 through chamber 68, passes from the chamber through slot 70 into chamber 72 in third housing section 18 where it is retained during a predetermined processing period. The bar may be retained in its depressed position until it is desired to make another exposure, at which time it is allowed to return to its initial position. During return movement of the bar, feet 120 move between the margins of an assemblage 42 and the rear surface of wall 30 until they move through passage 122 into upper enlarged portion 26, whereupon the last-mentioned assemblage 42 moves under the bias of springs 44 into exposure position in contact with the rear surface of wall 30.

Figure 12:
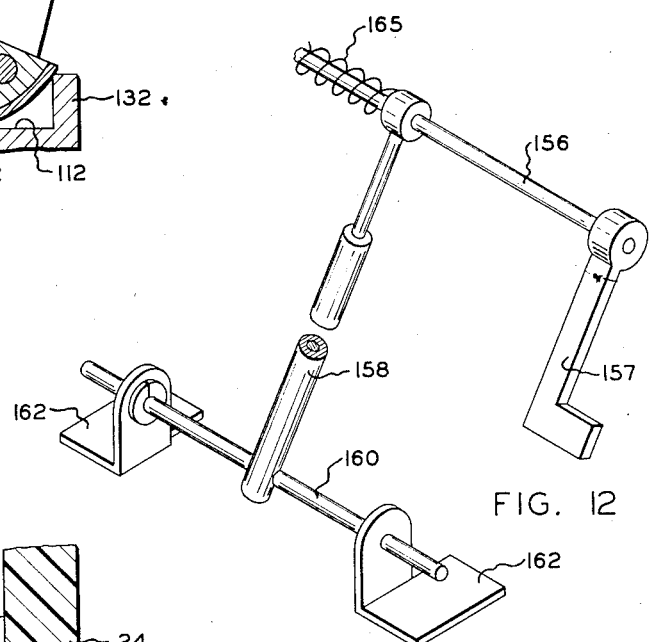
Fig. 12 is a perspective view, partially broken away, of a part of the mechanism of the camera of Fig. 11.
Figure 13:
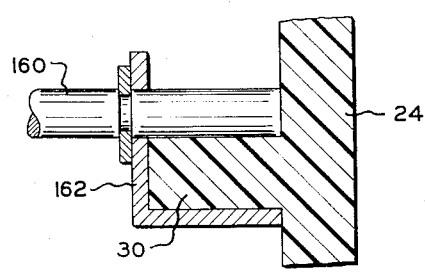
Fig. 13 is a sectional view through a portion of the mechanism of Fig. 12.
Figure 11:
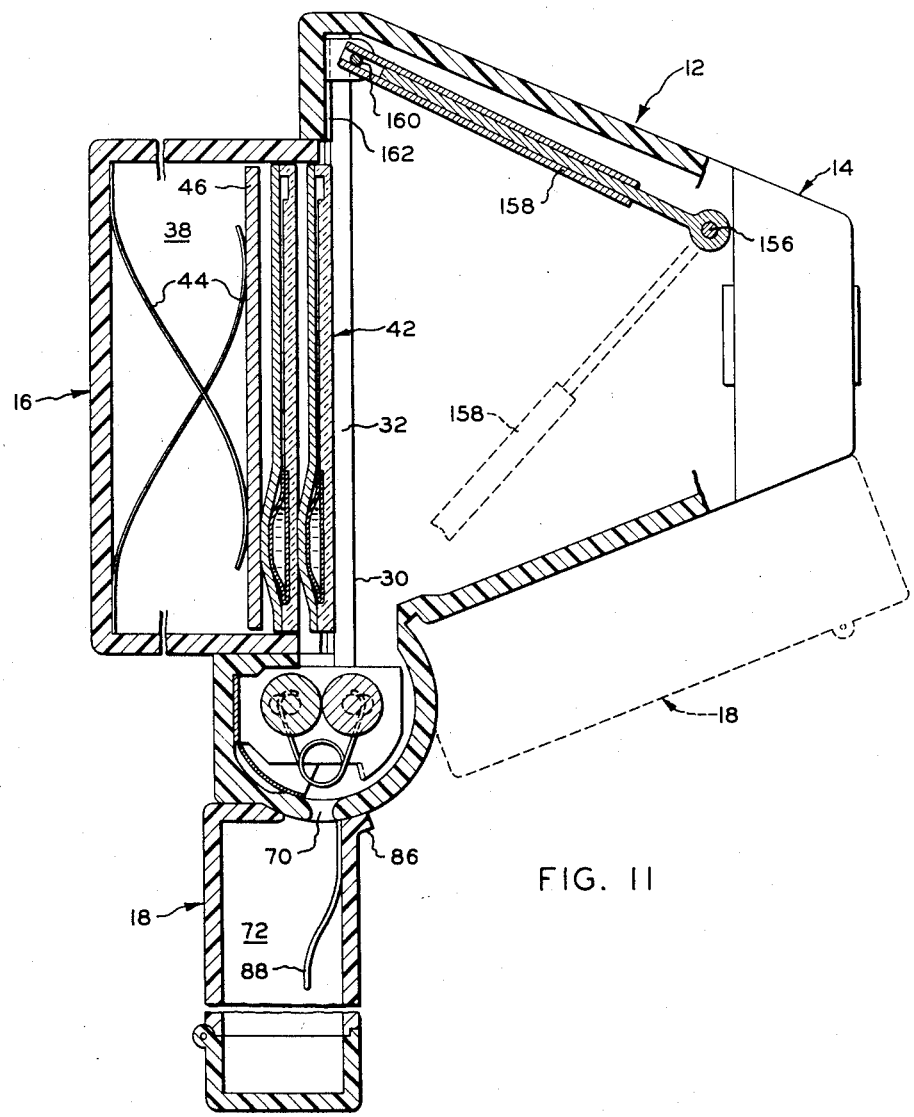
Fig. 11 is an elevational view, similar to Fig. 1, of another form of camera embodying the herein-disclosed invention.

Another embodiment of the camera is illustrated in Figs. 11 through 13 of the drawings and, while basically the same as that shown in Fig. 1, comprises a different type of mechanism for pushing the photographic assemblages between the pressure-applying rolls. In the form shown, this mechanism comprises a pivotable shaft 156 secured between the side walls of the forward portion adjacent the lens and shutter mechanism and out of the path of light from the lens of assemblage 14. One end of shaft 156 extends exteriorly of the camera housing and has a manually engageable crank 157 attached thereto. Secured to shaft 156 substantially midway between the sides of the camera is a two-element telescoping arm 158 which extends rearwardly. Secured to the end of arm 158 is a shaft 160 extending generally parallel with shaft 156 and in a plane parallel to the plane of the front and rear surfaces of rear wall 30. The ends of shaft 160 are adapted to bear against or ride on the forward surface of rear wall 30 between the side walls of the camera. Secured at opposite ends of shaft 160 are a pair of L-shaped feet 162 which extend through aperture 32 and into contact with the rear surface of rear wall 30 in position to engage and push each assemblage 42 through the pressure-applying rolls. The arrangement is such that, when shaft 156 is pivoted in a counterclockwise direction, as shown by broken lines in Fig. 11, feet 162 are moved downward so as to engage and push the foremost assemblage 42 between the pressure-applying rolls.

A spring means, for example in the form of a torsion spring 165 coiled around shaft 156, is provided for pivoting the shaft in a clockwise direction so as to return feet 162 upward to their initial position in readiness for exposing and processing an assemblage 42. A suitable linkage is, of course, provided for cocking the shutter during clockwise rotation of shaft 156 and for tripping the shutter during and in response to the initial counterclockwise rotation of the shaft. Telescoping arm 158 is provided to allow for the straight line movement of shaft 160 and feet 162.

In still another embodiment of the apparatus of the invention, the sliding bar 106 is operated in response to the rotation of gear 124 and is not operated directly. In this embodiment the shaft 126 for mounting gear 124 extends from side to side of the camera, rather than from front to rear, and through one side wall of the housing. A manually engageable crank is attached to the shaft exterior of one side wall of the housing for rotating the gear to effect the movement of bar 106. Button 110, on the end of the bar, may be omitted since the bar is not manually depressed but functions only as a rack for moving engagement member 116. A torsion spring, similar to spring 130, may be provided for moving the bar in either direction with the crank serving to wind the spring during movement of the bar in the opposite direction. For example, the crank could be employed to move the bar upward into its initial position where it is retained by a release mechanism and at the same time wind or cock the shutter and tension a torsion spring for moving the bar downward. The release mechanism would also be operative to first trip the shutter and thereafter release the bar for downward movement under the bias of the torsion spring. In this structure a one-way clutch could be provided for connecting the shaft and the crank together with a return spring for the crank.

The present invention may be embodied in a variety of different forms of photographic apparatus, including the camera disclosed in the aforementioned application Serial No. 492,848, and a number of modifications of the herein described apparatus may occur to those skilled in the art and are considered to be included within the scope of the invention. These may include modifications in the construction of: the camera in which it is embodied; the specific structure for pushing the assemblage between a pair of pressure-applying members; the structure of the pressure-applying members; the contacting linkage between the plunger or pusher for the assemblages; and the shutter or other exposure-producing device. A variety of expedients are available for light-sealing various openings in the camera housing, mounting the housing section which provides the imbibition chamber, securing the magazine on the rear housing section to the forward housing section, and biasing the pressure-applying rolls toward one another. The invention may be employed with a number of different types of photographic assemblages so long as they are rigid enough to be pushed between a pair of pressure-applying members in the manner described, and the camera shown may be adapted, for example, to the production of photographs in color by providing a filter in association with the lens and using a photographic assemblage wherein the print-receiving element comprises a lenticular surface. It is also conceivable that the camera of the invention could be adapted to use as a viewer by providing a suitable light source either in association with the lens or in place of the magazine and/or a diffusing screen in place of the magazine at the rear of the housing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising, in combination, means defining a chamber capable of housing a plurality of photographic assemblages arranged in stacked relation, means for locating the foremost of said assemblages in position for exposure, exposure means operable to effect the photoexposure of the photosensitive element of said foremost assemblage positioned for exposure within said chamber, means defining an opening in one side of said chamber adjacent an edge of said foremost assemblage and being so dimensioned as to admit the passage of said foremost assemblage, a pair of pressure-applying members associated with said opening for engaging and applying compressive pressure to said foremost assemblage as it is moved through said opening following exposure in order to effect the release of a processing composition carried by said assemblage, pusher means within said chamber and mounted for movement therein between a first position adjacent the side of said chamber opposite said opening and a second position within said opening, said pusher means being adapted, during movement from said first to said second position, to engage and push said foremost assemblage completely through said opening between said pressure-applying members, and means connected with said pusher means and responsive to movement thereof from said first to said second position for rendering said exposure means operative to expose said foremost assemblage during the initial movement of said pusher means and prior to movement of said assemblage by said pusher means.

2. Photographic apparatus comprising, in combination, means defining a chamber capable of housing a plurality of photographic assemblages arranged in stacked relation, means for locating the foremost of said assemblages in position for exposure, shutter means operable to effect the photoexposure of the photosensitive element of said foremost assemblage positioned for exposure within said chamber, means defining an opening in one side of said chamber adjacent an edge of said foremost assemblage and being so dimensioned as to admit the passage of said foremost assemblage, a pair of pressure-applying members associated with said opening for engaging and applying compressive pressure to said foremost assemblage as it is moved through said opening following exposure in order to effect the release of a processing composition carried by said assemblage, pusher means within said chamber and mounted for movement therein between a first position adjacent the side of said chamber opposite said opening and a second position within said opening, said pusher means being adapted, during movement from said first to said second position, to engage and push said foremost assemblage completely through said opening between said pressure-applying members, and means coacting with said pusher means and responsive to movement of said pusher means from said first to said second position for releasing said shutter during the initial movement of said pusher means prior to movement of said assemblage by said pusher means.

3. Photographic apparatus for exposing and thereafter processing a succession of photographic assemblages, said apparatus comprising, in combination, means defining a chamber capable of housing a plurality of said photographic assemblages arranged in stacked relation, means for locating the foremost of said assemblages with the photosensitive element thereof in position for exposure, exposure means operable to effect the photoexposure of the photosensitive element of said foremost assemblage positioned for exposure within said chamber, means defining a passage in one side of said chamber so located and dimensioned as to be capable of admitting said foremost assemblage from exposure position, means within said passage for engaging said foremost assemblage during movement through said passage from said chamber to effect the release and distribution of a fluid composition carried by said assemblage, engagement means mounted for reciprocating movement between a first position adjacent the side of said chamber opposite said passage and a second position within said passage, said engagement means being adapted, during movement from said first to said second position, to engage and push said foremost assemblage substantially in a plane from exposure position within said chamber completely through said passage from said chamber, and means connected with said engagement means and responsive to movement thereof from said first to said second position for rendering said exposure means operative to expose said foremost assemblage during the initial movement of said engagement means and prior to movement of said assemblage by said engagement means.

4. Photographic apparatus for exposing and thereafter processing a succession of photographic assemblages, said apparatus comprising, in combination, means defining a chamber capable of housing a plurality of said photographic assemblages arranged in stacked relation, means for locating the foremost of said assemblages with the photosensitive element thereof in position for exposure, a shutter operable to effect the photoexposure of the photosensitive element of said foremost assemblage positioned within said chamber, means defining a passage in one side of said chamber so located and dimensioned as to be capable of admitting said foremost assemblage from exposure position, means within said passage for engaging said foremost assemblage during movement through said passage from said chamber to effect the release and distribution of a fluid composition carried by said assemblage, engagement means mounted for reciprocating movement between a first position adjacent the side of said chamber opposite said passage and a second position within said passage, said engagement means being adapted, during movement from said first to said second position, to engage and push said foremost assemblage substantially in a plane from exposure position within said chamber completely through said passage from said chamber, and means coacting with said engagement means and responsive to the movement thereof from said second to said first position for setting said shutter and responsive to the movement of said engagement means from said first to said second position for releasing said shutter during the initial movement of said engagement means prior to movement of said assemblage by said engagement means.

5. In photographic apparatus for exposing and thereafter processing a succession of photographic assemblages and including means defining a chamber capable of housing a plurality of said photographic assemblages arranged in stacked relation, in combination, means for locating the foremost of said assemblages with the photosensitive element thereof substantially in a plane in position for exposure, means defining a passage in one side of said chamber lying substantially in said plane adjacent one edge of said foremost assemblage and capable of admitting said foremost assemblage from exposure position, means within said passage for engaging said foremost assemblage during movement thereof in said plane through said passage from said chamber to effect the release of a fluid composition carried by said assemblage, and engagement means mounted for reciprocating movement substantially in said plane through said chamber between a first position, adjacent the side of said chamber opposite said passage wherein said engagement means are engageable with an edge portion of said foremost assemblage and are located entirely to one side of said assemblages, and a second position within said passage, said engagement means being effective, during movement from said first to said second position, to engage and push said foremost assemblage substantially in said plane from exposure position within said chamber completely through said passage from said chamber.

6. In photographic apparatus for exposing and thereafter processing a succession of photographic assemblages and including means defining a chamber capable of housing a plurality of said photographic assemblages arranged in stacked relation, in combination, means for locating the foremost of said assemblages with the photosensitive element thereof substantially in a plane in position for exposure, means defining a passage in one side of said chamber lying in said plane adjacent one edge of said foremost assemblage and capable of admitting said foremost assemblage from exposure position, pressure-applying means within said passage for effecting the release of fluid composition carried by said assemblage during movement of said assemblage in said plane through said passage from said chamber, engagement means mounted for reciprocating movement in said plane through said chamber between a first position, adjacent the side of said chamber opposite said passage wherein said engagement means are engageable with an edge portion of said foremost assemblage and are located entirely to one side of said assemblages, and a second position within said passage, said engagement means being effective, during movement in said plane from said first to said second position, to engage and push said foremost assemblage substantially in said plane from exposure position within said chamber completely through said passage from said chamber, and means defining a processing chamber communicating with said passage and adapted to receive and contain at least one of said assemblages during movement of said assemblage from the first-mentioned chamber through said passage.

7. Photographic apparatus for exposing and thereafter processing the photosensitive elements of a succession of photographic assemblages, said apparatus comprising, in combination, a first housing section, exposure means associated with said first housing section, a second housing section mounted on said first housing section and providing a chamber for storing a plurality of photographic assemblages arranged in stacked relation, means comprising said first housing section for locating the foremost of said assemblages with the photosensitive element thereof in position for exposure, said first and second housing sections cooperating to define an opening in one side of said chamber so located and dimensioned as to be capable of admitting said foremost assemblage from exposure position, pusher means including engagement means mounted for movement within said chamber, substantially in a plane located between said assemblages and said exposure means, between a first position adjacent the side of said chamber opposite said opening, at which position said engagement means are engageable with an edge portion of said foremost film assemblage and said pusher means and engagement means are located to one side of said assemblages out of the path of light between said exposure means and said foremost assemblage, and a second position within said opening, and pressure-applying means associated with said opening in the path of movement of said foremost photographic assemblage through said opening for releasing a fluid processing composition carried by said assemblage as it moved from said chamber through said passage, said engagement means being adapted, during movement within said plane from said first to said second position, to engage and push said foremost assemblage substantially in a plane from exposure position within said chamber completely through said opening from said chamber.

8. Photographic apparatus as defined in claim 7 wherein said first and second sections cooperate to provide a passage in the side of said chamber opposite said opening substantially in the plane thereof, the dimensions of said passage being insufficient to permit the movement of one of said assemblages therethrough, said engagement means being movable through said passage to a first position within said passage wherein it is located out of contact with said foremost assemblage and is movable a predetermined distance in the direction of said opening before engaging said foremost assemblage and moving said assemblage through said opening, and including means located for engagement by said pusher means during the initial movement thereof and responsive to engagement by said pusher means for actuating said exposure means to make an exposure prior to movement of said foremost assemblage.

9. Photographic apparatus for exposing and thereafter processing the photosensitive elements of a succession of photographic assemblages, said apparatus comprising, in combination, a first housing section, exposure means associated with said first housing section, a second housing section mounted on said first housing section and providing a chamber for storing a plurality of said photographic assemblages arranged in stacked relation, means comprising said first housing section for locating the foremost of said assemblages with the photosensitive element thereof in position for exposure, said first and second housing sections cooperating to define an opening in one side of said chamber so located and dimensioned as to be capable of admitting said foremost assemblage from exposure position, pusher means mounted for reciprocating movement within said chamber between a first position adjacent the side of said chamber opposite said opening and a second position within said opening, pressure-applying means associated with said opening in the path of movement of said foremost photographic assemblage through said opening for releasing a fluid processing composition carried by said assemblage as it is moved from said chamber through said passage, said pusher means being adapted, during movement from said first to said second position, to engage and push said foremost assemblage substantially in a plane from exposure position within said chamber completely through said opening from said chamber, and means coupled with said pusher means and responsive to the initial movement thereof from said first position to said second position for actuating said exposure means.

10. Photographic apparatus for exposing and thereafter processing the photosensitive elements of a succession of photographic assemblages, said apparatus comprising, in combination, a first housing section, a shutter associated with said first housing section, a second housing section mounted on said first housing section and providing a chamber for storing a plurality of said photographic assemblages arranged in stacked relation, means comprising said first housing section for locating the foremost of said assemblages with the photosensitive element thereof in position for exposure, said first and second housing sections cooperating to define an opening in one side of said chamber so located and dimensioned as to be capable of admitting said foremost assemblage from exposure position, pusher means mounted for reciprocating movement within said chamber between a first position adjacent the side of said chamber opposite said opening and a second position within said opening, pressure-applying means associated with said opening in the path of movement of said foremost photographic assemblage through said opening for releasing a fluid processing composition carried by said assemblage as it is moved from said chamber through said passage, said pusher means being adapted, during movement from said first to said second position, to engage and push said foremost assemblage substantially in a plane from exposure position within said chamber completely through said opening from said chamber, and means coacting with said pusher means and responsive to movement thereof from said second to said first position for setting said shutter and responsive to movement of said pusher means from said first to said second position for releasing said shutter during initial movement of said pusher means prior to movement of said assemblage thereby.

11. Photographic apparatus comprising, in combination, a first housing section, exposure means associated with said first housing section, a second housing section mounted on said first housing section and defining a chamber capable of containing a plurality of photographic assemblages arranged in stacked relation, said first housing section including means for locating the foremost of said assemblages with the photosensitive element thereof in position for exposure, said first and second housing sections cooperating to provide an opening in one side of said chamber adjacent an edge of said foremost assemblage and being so dimensioned as to admit the passage of said foremost assemblage, a pair of pressure-applying members associated with said opening for engaging and applying compressive pressure to said foremost assemblage as it is moved through said opening following exposure in order to effect the release of fluid processing composition carried by said assemblage, pusher means mounted for movement within said chamber between a first position adjacent the side of said chamber opposite said opening and a second position within said opening, said pusher being adapted, during movement from said first to said second position, to engage and push said foremost assemblage substantially in a plane completely through said opening between said pressure-applying members, and means coupled with said pusher means and responsive to the initial movement thereof from said first position for actuating said exposure means.

12. Photographic apparatus comprising, in combination, a first housing section, a shutter associated with said first housing section, a second housing section mounted on said first housing section and defining a chamber capable of containing a plurality of photographic assemblages arranged in stacked relation, said first housing section including means for locating the foremost of said assemblages with the photosensitive element thereof in position for exposure, said first and second housing sections cooperating to provide an opening in one side of said chamber adjacent an edge of said foremost assemblage and being so dimensioned as to admit the passage of said foremost assemblage, a pair of pressure-applying members associated with said opening for engaging and applying compressive pressure to said foremost assemblage as it is moved through said opening following exposure in order to effect the release of fluid processing composition carried by said assemblage, pusher means mounted for movement within said chamber between a first position adjacent the side of said chamber opposite said opening and a second position within said opening, said pusher being adapted, during movement from said first to said second position, to engage and push said foremost assemblage substantially in a plane completely through said opening between said pressure-applying members, and means coacting with said pusher means and responsive to movement thereof from said second to said first position for setting said shutter and responsive to movement of said pusher means from said first to said second position for releasing said shutter during initial movement of said pusher means prior to movement of said assemblage thereby.

13. Photographic apparatus comprising, in combination, a first housing section, exposure means associated with the forward portion of said first housing section, means comprising the rear portion of said first housing section for locating a photographic assemblage with the photosensitive element thereof in position for exposure, a second housing section mounted on the rear of said first housing section, said second housing section providing a chamber for storing a plurality of said photographic assemblages in stacked relation with the foremost of said assemblages located in position for exposure, said first and second housing sections cooperating to provide a first passage in one side of said chamber adjacent one edge of said foremost assemblage, said first passage being so dimensioned as to permit the movement of only said foremost assemblage therethrough, a pair of pressure-applying members mounted adjacent said passage in position to receive said foremost assemblage therebetween during movement of said assemblage through said passage, said pressure-applying members being adapted to effect the release and distribution of a fluid processing composition carried by said assemblage during movement thereof between said members, said first and second housing sections cooperating to provide a second passage, the dimensions of which preclude the movement of one of said assemblages therethrough, in the side of said chamber opposite said first passage, pusher means including engagement means mounted for movement within said chamber between a first position within said second passage and a second position between said pressure-applying members, said engagement means being movable substantially in a plane located forward of said foremost film assemblage between the latter and said exposure means and being adapted, during movement from said first to said second position, to engage and push said foremost assemblage substantially in a plane completely through said first passage and between said pressure-applying members, said engagement means being movable a predetermined distance from said first to said second position prior to engagement and movement of said foremost assemblage, and means mounted for coaction with said pusher means during the initial movement of said engagement means and being responsive to coaction with said pusher means for actuating said exposure means to make an exposure prior to movement of said foremost assemblage.

14. Photographic apparatus comprising, in combination, a first housing section, a shutter associated with the forward portion of said first housing section, means comprising the rear portion of said first housing section for locating a photographic assemblage with the photosensitive element thereof in position for exposure, a second housing section mounted on the rear of said first housing section, said second housing section providing a chamber for storing a plurality of said photographic assemblages in stacked relation with the foremost of said assemblages located in position for exposure, said first and second housing sections cooperating to provide a first passage in one side of said chamber adjacent one edge of said foremost assemblage, said first passage being so dimensioned as to permit the movement of only said foremost assemblage therethrough, a pair of pressure-applying members mounted adjacent said passage in position to receive said foremost assemblage therebetween during movement of said assemblage through said passage, said pressure-applying members being first adapted to effect the release and distribution of a fluid processing composition carried by said assemblage during movement thereof between said members, said first and second housing sections cooperating to provide a second passage, the dimensions of which preclude the movement of one of said assemblages therethrough in the side of said chamber opposite said first passage, pusher means including engagement means mounted for movement within said chamber between a first position within said second passage and a second position between said pressure-applying members, said engagement means being adapted, during movement from said first to said second position, to engage and push said foremost assemblage substantially in a plane completely through said first passage between said pressure-applying members, said engagement means being movable a predetermined distance from said first position in the direction of said second position prior to engagement and movement of said foremost assemblage, and means coacting with said pusher means and responsive to movement of said engagement means from said second to said first position for setting said shutter and responsive to movement of said engagement means from said first to said second position for releasing said shutter during the initial movement of said engagement means prior to engagement and movement of said assemblage thereby.

References Cited in the file of this patent

UNITED STATES PATENTS

| | | |
|---|---|---|
| 478,780 | Bristol | July 12, 1892 |
| 2,496,630 | Land | Feb. 7, 1950 |